(12) United States Patent
Chen (10) Patent No.: US 9,753,515 B2
(45) Date of Patent: Sep. 5, 2017

(54) ANTI-DEADLOCK CIRCUIT FOR VOLTAGE REGULATOR AND ASSOCIATED POWER SYSTEM

(71) Applicant: FARADAY TECHNOLOGY CORPORATION, Hsinchu (TW)

(72) Inventor: Chi-Yang Chen, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 0 days.

(21) Appl. No.: 15/081,141

(22) Filed: Mar. 25, 2016

(65) Prior Publication Data

US 2017/0133930 A1    May 11, 2017

(30) Foreign Application Priority Data

Nov. 9, 2015 (TW) ............... 104136912 A (51) Int. Cl.
G05F 1/46 (2006.01)
G05F 1/56 (2006.01)
(Continued)

(52) U.S. Cl.
CPC . *G06F 1/32* (2013.01); *G05F 1/56* (2013.01)

(58) Field of Classification Search
CPC . G05F 1/462; G05F 1/465; G05F 1/56; G05F 1/565; G05F 1/575; H02M 1/36;
(Continued)

(56) References Cited

U.S. PATENT DOCUMENTS

| 6,188,257 B1 * | 2/2001 | Buer | H03K 17/22 |
| | | | 326/94 |
| 6,553,496 B1 * | 4/2003 | Buer | G06F 21/55 |
| | | | 327/18 |

(Continued)

FOREIGN PATENT DOCUMENTS

| CN | 1304503 | 7/2001 |
| CN | 103178827 | * 6/2013 |

OTHER PUBLICATIONS

Machine English Translation on CN103178827,Jun. 26, 2013.*
Taiwan Intellectual Property Office, Office Action dated Aug. 25, 2016.

*Primary Examiner* — Timothy J Dole
*Assistant Examiner* — Sisay G Tiku
(74) *Attorney, Agent, or Firm* — Winston Hsu (57) ABSTRACT

A power system includes a voltage regulating system and a digital circuit. The voltage regulating system receives a power down signal. The voltage regulating system selectively generates an output voltage according to the power down signal. When the digital circuit receives the output voltage, the digital circuit is operated. When the digital circuit is not operated, the power down signal is activated. After the external voltage source is switched on and before a voltage of the external voltage source reaches a fixed voltage, the voltage regulating system ignores the power down signal and generates the output voltage. After the voltage of the external voltage source reaches the fixed voltage, the voltage regulating system generates the output voltage if the power down signal is inactivated; the voltage regulating system stops generating the output voltage if the power down signal is activated.

11 Claims, 6 Drawing Sheets

(51) Int. Cl.
*G05F 1/565* (2006.01)
*G05F 1/567* (2006.01)
*H02M 1/36* (2007.01)
*H02M 1/00* (2006.01)
*G06F 1/32* (2006.01)

(58) Field of Classification Search
CPC ......... H02M 2001/0012; H02M 3/157; H02M 3/156
See application file for complete search history.

(56) References Cited

U.S. PATENT DOCUMENTS

| | | | |
|---|---|---|---|
| 7,076,802 B2 * | 7/2006 | Poisner | G06F 21/71 713/500 |
| 8,352,752 B2 * | 1/2013 | Croguennec | G11C 7/24 257/922 |
| 9,647,699 B1 * | 5/2017 | Gupta | H04B 1/04 |

* cited by examiner

ANTI-DEADLOCK CIRCUIT FOR VOLTAGE REGULATOR AND ASSOCIATED POWER SYSTEM

This application claims the benefit of Taiwan Patent Application No. 104136912, filed Nov. 9, 2015, the subject matter of which is incorporated herein by reference.

FIELD OF THE INVENTION

The present invention relates to a control circuit for a voltage regulator and an associated circuit system, and more particularly to an anti-deadlock circuit for a voltage regulator and an associated power system.

BACKGROUND OF THE INVENTION

Figure 1A:
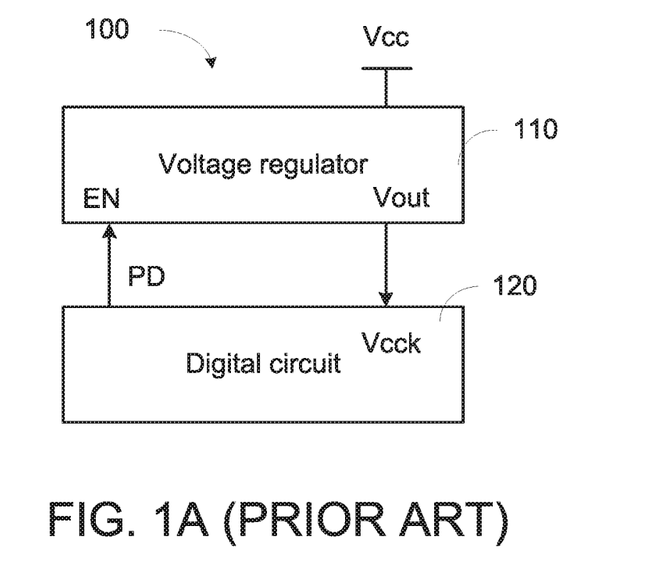
FIG. 1A (prior art) is a schematic functional block diagram illustrating a conventional power system.

FIG. 1A is a schematic functional block diagram illustrating a conventional power system. As shown in FIG. 1A, the conventional power system 100 comprises a voltage regulator 110 and a digital circuit 120. The voltage regulator 110 is connected with an external voltage source Vcc. Moreover, the voltage regulator 110 generates an output voltage Vout to a power supply terminal Vcck of the digital circuit 120. When the digital circuit 120 receives the output voltage Vout, the digital circuit 120 is normally operated.

The voltage regulator 110 further has an enabling terminal EN for receiving a power down signal PD from the digital circuit 120. When the power down signal PD is inactivated, the voltage regulator 110 is enabled to issue the output voltage Vout to the digital circuit 120. In case that the power down signal PD is activated, the voltage regulator 110 is disabled, and thus the output voltage Vout is not issued to the digital circuit 120.

When the digital circuit 120 is not operated, the digital circuit 120 activates the power down signal PD. Consequently, the voltage regulator 110 stops issuing the output voltage Vout to the digital circuit 120. After the digital circuit 120 is disabled because the output voltage Vout is not received, the user may switch off the external voltage source Vcc.

For operating the digital circuit 120 again, the user may switch on the external voltage source Vcc. After the external voltage source Vcc is switched on, the voltage regulator 110 is enabled to issue the output voltage Vout to the digital circuit 120. Consequently, the digital circuit 120 can be operated again.

However, after the external voltage source Vcc is switched on, the voltage of the external voltage source Vcc gradually increases from 0V to a stable fixed voltage (e.g., 1.8V). Before the voltage of the external voltage source Vcc reaches the stable fixed voltage, the output voltage Vout from the voltage regulator 110 is unstable. In this situation, the power down signal PD from the digital circuit 120 contains noise. Due to the noise of the power down signal PD, the voltage regulator 110 is disabled and the overall power system 100 is in a deadlock state. When the power system 100 is in the deadlock state, the voltage regulator 110 cannot issue the output voltage Vout. Under this circumstance, the digital circuit 120 cannot be operated.

Figure 1B:
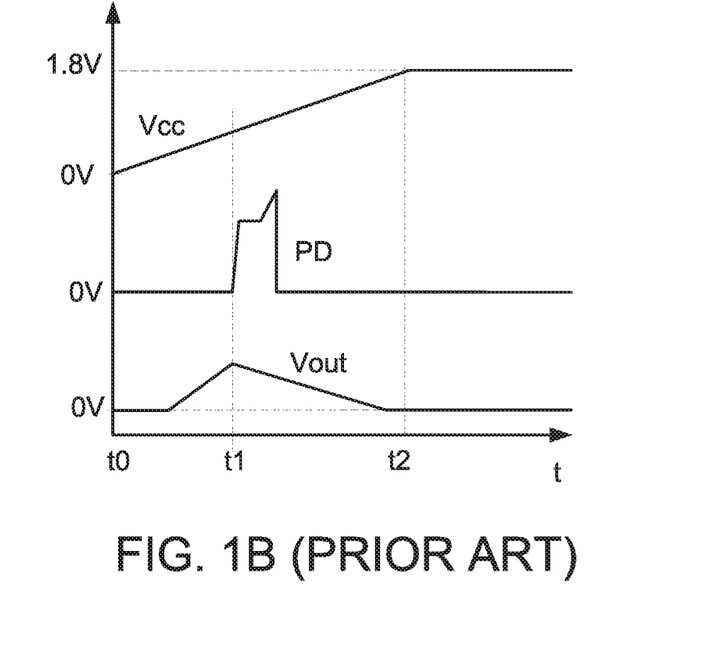
FIG. 1B (prior art) is a schematic timing waveform diagram illustrating the signals associated with the digital circuit and the voltage regulator of the conventional power system.

FIG. 1B is a schematic timing waveform diagram illustrating the signals associated with the digital circuit and the voltage regulator of the conventional power system.

At the time point t0, the external voltage source Vcc is switched on. Consequently, the voltage of the external voltage source Vcc gradually increases from 0V to a stable fixed voltage (e.g., 1.8V).

While the voltage of the external voltage source Vcc gradually increases and does not reach the steady state, the power down signal PD from the digital circuit 120 contains noise at the time point t1. Due to the noise of the power down signal PD, the voltage regulator 110 is disabled.

In other words, the voltage regulator 110 is disabled after the time point t1. Consequently, the output voltage Vout gradually decreases to 0V. Even if the voltage of the external voltage source Vcc reaches the stable fixed voltage at the time point t2, the voltage regulator 110 cannot issue the output voltage Vout. Under this circumstance, the voltage regulator 110 is disabled, and the overall power system 100 is in a deadlock state.

SUMMARY OF THE INVENTION

An embodiment of the present invention provides a power system. The power system includes a voltage regulating system and a digital circuit. The voltage regulating system is connected with an external voltage source, and receives a power down signal. The voltage regulating system selectively generates an output voltage according to the power down signal. The digital circuit is connected with the voltage regulating system. When the digital circuit receives the output voltage, the digital circuit is operated. When the digital circuit is not operated, the power down signal is activated. After the external voltage source is switched on and before a voltage of the external voltage source reaches a fixed voltage, the voltage regulating system ignores the power down signal and generates the output voltage. After the voltage of the external voltage source reaches the fixed voltage, the voltage regulating system generates the output voltage if the power down signal is inactivated, and the voltage regulating system stops generating the output voltage if the power down signal is activated.

Another embodiment of the present invention provides a power system. The power system includes a digital circuit, a first voltage regulating system and a second voltage regulating system. The digital circuit includes a first digital module and a second digital module. The first digital module is operated when the first digital module receives a first output voltage. The first digital module selectively activates a first power down signal. The second digital module is operated when the second digital module receives a second output voltage. The second digital module selectively activates a second power down signal. The first voltage regulating system is connected with an external voltage source, and receives the second power down signal. The first voltage regulating system selectively generates the first output voltage according to the second power down signal. The second voltage regulating system is connected with the external voltage source, and receives the first power down signal. The second voltage regulating system selectively generates the second output voltage according to the first power down signal. After the external voltage source is switched on and before a voltage of the external voltage source reaches a fixed voltage, the first voltage regulating system ignores the second power down signal and generates the first output voltage. After the voltage of the external voltage source reaches the fixed voltage, the first voltage regulating system generates the first output voltage if the second power down signal is inactivated, and the first voltage regulating system stops generating the first output voltage if the second power down signal is activated.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
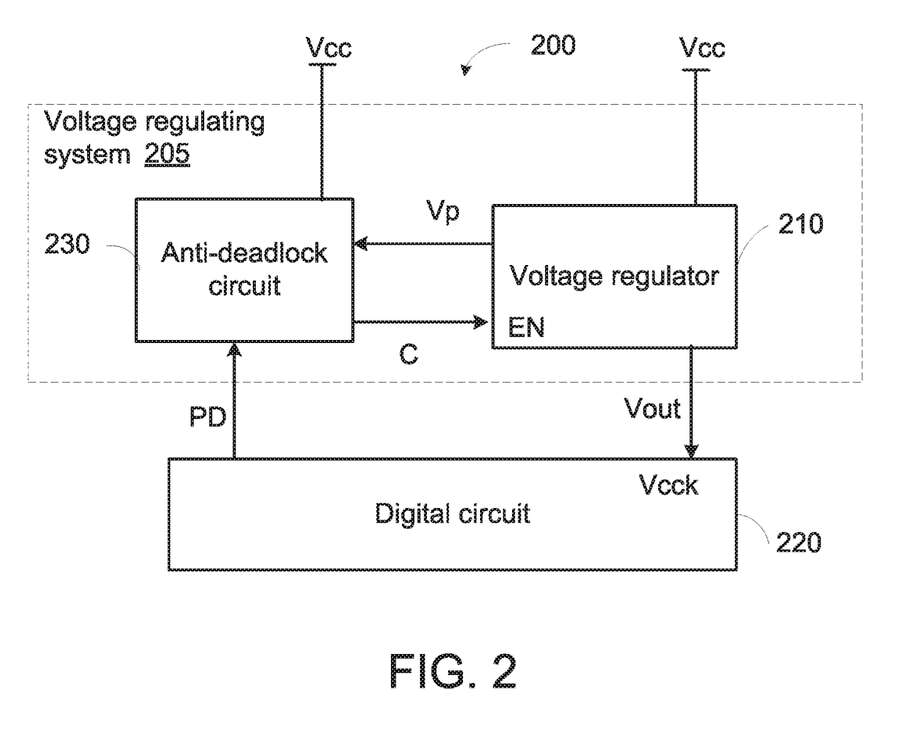
FIG. 2 is a schematic functional block diagram illustrating a power system according to an embodiment of the present invention.

FIG. 2 is a schematic functional block diagram illustrating a power system according to an embodiment of the present invention. As shown in FIG. 2, the power system 200 comprises a voltage regulator 210, an anti-deadlock circuit 230 and a digital circuit 220. The voltage regulator 210 and the anti-deadlock circuit 230 are collaboratively defined as a voltage regulating system 205.

The voltage regulator 210 is connected with an external voltage source Vcc. Moreover, the voltage regulator 210 generates an output voltage Vout to a power supply terminal Vcck of the digital circuit 220. When the digital circuit 220 receives the output voltage Vout, the digital circuit 220 is normally operated. The voltage regulator 210 generates a proportional voltage Vp to the anti-deadlock circuit 230. There is a fixed ratio between the proportional voltage Vp and the output voltage Vout.

The anti-deadlock circuit 230 is connected with an external voltage source Vcc. Moreover, the anti-deadlock circuit 230 receives the proportional voltage Vp from the voltage regulator 210 and a power down signal PD from the digital circuit 220. According to the proportional voltage Vp and the power down signal PD, the anti-deadlock circuit 230 generates a control signal C to an enabling terminal EN of the voltage regulator 210.

In response to a first voltage level (e.g., a high voltage level) of the control signal C from the anti-deadlock circuit 230, the voltage regulator 210 is enabled to generate the output voltage Vout. In response to a second voltage level (e.g., a low voltage level) of the control signal C from the anti-deadlock circuit 230, the voltage regulator 210 is disabled and the output voltage Vout is not generated.

As mentioned above, there is a fixed ratio between the proportional voltage Vp and the output voltage Vout. Consequently, if the output voltage Vout does not reach a steady state, the proportional voltage Vp does not reach the steady state.

After the external voltage source Vcc is switched on, the anti-deadlock circuit 230 judges whether the proportional voltage Vp reaches the steady state. Before the proportional voltage Vp reaches the steady state, the anti-deadlock circuit 230 blocks the power down signal PD. Consequently, the control signal C is maintained at the first voltage level (e.g., the high voltage level). When the proportional voltage Vp reaches the steady state, the anti-deadlock circuit 230 converts the power down signal PD into the control signal C.

That is, regardless of whether the power down signal PD is changed before the proportional voltage Vp reaches the steady state, the voltage level of the control signal C is kept unchanged. Consequently, the voltage regulator 210 is continuously enabled.

After the proportional voltage Vp reaches the steady state, the output voltage Vout reaches a stable fixed voltage. Consequently, the digital circuit 220 is normally operated. Moreover, the power down signal PD is inactivated during the normal operation of the digital circuit 220. Consequently, the control signal C from the anti-deadlock circuit 230 is maintained at the first voltage level (e.g., the high voltage level). Under this circumstance, the voltage regulator 210 is continuously enabled to generate the output voltage Vout to the digital circuit 220.

Whereas, in case that the digital circuit 220 is not operated, the power down signal PD is activated by the digital circuit 220. Meanwhile, the control signal C from the anti-deadlock circuit 230 has the second voltage level (e.g., the low voltage level). Under this circumstance, the voltage regulator 210 is disabled, and thus the output voltage Vout is not issued to the digital circuit 220. Consequently, the digital circuit 220 is not operated.

After the digital circuit 220 is disabled because the output voltage Vout is not received, the user may switch off the external voltage source Vcc.

For operating the digital circuit 220 again, the user may switch on the external voltage source Vcc. As mentioned above, before the voltage of the external voltage source Vcc reaches the stable fixed voltage, the anti-deadlock circuit 230 can effectively block the power down signal PD even if the power down signal PD from the digital circuit 220 contains noise. Consequently, the voltage regulator 210 continuously generates the output voltage Vout. That is, the power system 200 is not in the deadlock state.

After the output voltage Vout reaches the steady state and the digital circuit 220 is normally operated, the anti-deadlock circuit 230 generates the control signal according to the power down signal PD from the digital circuit 220.

Figure 3A:
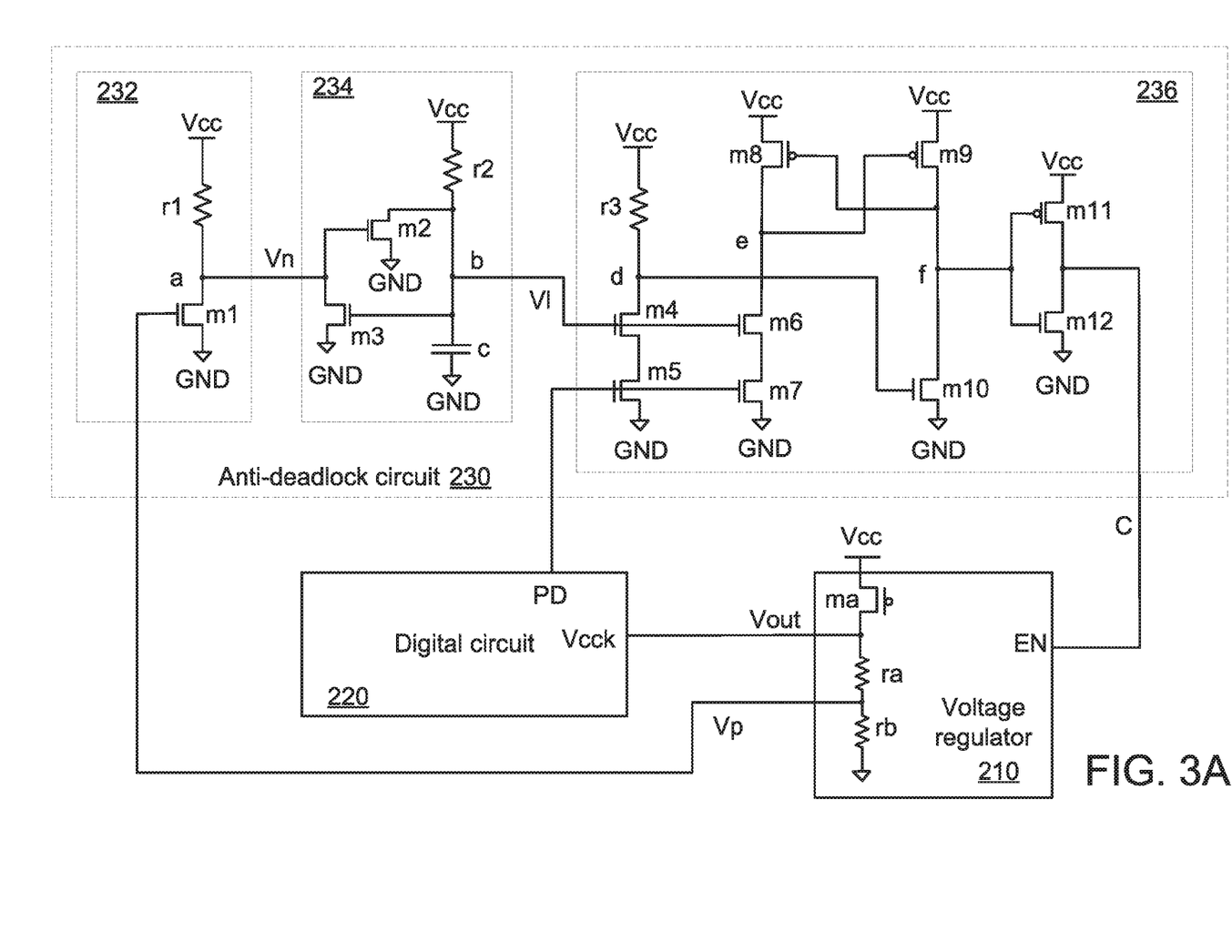
FIG. 3A is a schematic circuit diagram illustrating a first exemplary anti-deadlock circuit used in the power system of the present invention.

FIG. 3A is a schematic circuit diagram illustrating a first exemplary anti-deadlock circuit used in the power system of the present invention. As shown in FIG. 3A, the anti-deadlock circuit 230 comprises a voltage detecting circuit 232, a latching circuit 234 and a controlling circuit 236. The output terminal of the voltage regulator 210 is serially connected with two resistors ra and rb in order to define a voltage divider. When the voltage regulator 210 is enabled, the transistor ma is turned on. Consequently, the voltage regulator 210 generates the proportional voltage Vp and the output voltage Vout.

The voltage detecting circuit 232 receives the proportional voltage Vp. If the proportional voltage Vp is lower than or equal to a threshold voltage, a notice signal Vn outputted from the output terminal of the voltage detecting circuit 232 is equal to the voltage of the external voltage source Vcc. Whereas, if the proportional voltage Vp is higher than the threshold voltage, the notice signal Vn from the output terminal of the voltage detecting circuit 232 is switched to a low level state.

The notice signal Vn from the voltage detecting circuit 232 is received and recorded by the latching circuit 234. Before the notice signal Vn is switched to the low level state, a latched signal VI outputted from the latching circuit 234 has a second voltage level (e.g., a low voltage level). After the notice signal Vn is switched to the low level state, the latched signal VI outputted from the latching circuit 234 has a first voltage level (e.g., a high voltage level).

The controlling circuit 236 receives the latched signal VI and the power down signal PD, and generates the control signal C. When the latched signal VI has the second voltage level (e.g., the low voltage level), regardless of the change of the power down signal PD, the control signal C from the controlling circuit 236 continuously enable the voltage regulator 210.

Whereas, when the latched signal VI has the first voltage level (e.g., the high voltage level), the control signal C from the controlling circuit 236 is determined according to the power down signal PD. In case that the power down signal PD is inactivated, the control signal C from the controlling circuit 236 enables the voltage regulator 210. Whereas, in case that the power down signal PD is activated, the control signal C from the controlling circuit 236 disables the voltage regulator 210. The circuitry of the anti-deadlock circuit 230 will be illustrated in more details as follows.

The voltage detecting circuit 232 comprises a transistor m1 and a resistor r1. The gate terminal of the transistor m1 receives the proportional voltage Vp. The drain terminal of the transistor m1 is connected with a node a. The source terminal of the transistor m1 is connected with a ground voltage GND. The resistor r1 is connected between the external voltage source Vcc and the node a. The node a is the output terminal of the voltage detecting circuit 232 for outputting the notice signal Vn.

If the proportional voltage Vp is lower than or equal to the threshold voltage of the transistor m1, the proportional voltage Vp (or the external voltage source Vcc) does not reach the steady state. Meanwhile, the transistor m1 is turned off, and the notice signal Vn is equal to the voltage of the external voltage source Vcc. Whereas, if the proportional voltage Vp is higher than the threshold voltage of the transistor m1, the proportional voltage Vp (or the external voltage source Vcc) reaches the steady state. Meanwhile, the transistor m1 is turned on, and the notice signal Vn is switched to the low level state.

The latching circuit 234 comprises a transistor m2, a transistor m3, a resistor r2 and a capacitor c. The gate terminal of the transistor m2 is connected with the gate a. The drain terminal of the transistor m2 is connected with the node b. The source terminal of the transistor m2 is connected with the ground voltage GND. The gate terminal of the transistor m3 is connected with the node b. The drain terminal of the transistor m3 is connected with the node a. The source terminal of the transistor m3 is connected with the ground voltage GND. The resistor r2 is connected between the external voltage source Vcc and the node b. The capacitor c is connected between the node b and the ground voltage GND. Moreover, the node b is the output terminal of the latching circuit 234 for outputting the latched signal VI.

When the notice signal Vn is equal to the voltage of the external voltage source Vcc, the transistor m2 is turned on and the transistor m3 is turned off. In addition, the latched signal VI from the latching circuit 234 has the second voltage level (e.g., the low voltage level). When the notice signal Vn is switched to the low level state, the transistor m2 is turned off and the transistor m3 is turned on. Consequently, the capacitor c is charged to the voltage of the external voltage source Vcc. Under this circumstance, the latched signal VI from the latching circuit 234 has the first voltage level (e.g., the high voltage level).

The controlling circuit 236 comprises a transistor m4, a transistor m5, a transistor m6, a transistor m7, a transistor m8, a transistor m9, a transistor m10, a transistor m11, a transistor m12 and a resistor r3. The gate terminal of the transistor m4 receives the latched signal VI. The drain terminal of the transistor m4 is connected with a node d. The gate terminal of the transistor m5 receives the power down signal PD. The drain terminal of the transistor m5 is connected with the source terminal of the transistor m4. The source terminal of the transistor m5 is connected with the ground voltage GND. The resistor r3 is connected between the external voltage source Vcc and the node d. The gate terminal of the transistor m6 receives the latched signal VI. The drain terminal of the transistor m6 is connected with a node e. The gate terminal of the transistor m7 receives the power down signal PD. The drain terminal of the transistor m7 is connected with the source terminal of the transistor m6. The source terminal of the transistor m7 is connected with the ground voltage GND. The gate terminal of the transistor m8 is connected with a node f. The drain terminal of the transistor m8 is connected with a node e. The source terminal of the transistor m8 is connected with the external voltage source Vcc. The gate terminal of the transistor m9 is connected with the node e. The drain terminal of the transistor m9 is connected with the node f. The source terminal of the transistor m9 is connected with the external voltage source Vcc. The gate terminal of the transistor m10 is connected with the node d. The drain terminal of the transistor m10 is connected with the node f. The source terminal of the transistor m10 is connected with the ground voltage GND. The transistors m11 and m12 are collaboratively formed as an inverter. The input terminal of the inverter is connected with the node f. The output terminal of the inverter generates the control signal.

When the latched signal VI is in the low level state, both of the transistor m4 and the transistor m6 are turned off. Consequently, the voltage at the node d is equal to the voltage of the external voltage source Vcc. In addition, the transistor m10 is turned on, the node f is in the low level state, the transistor m8 is turned on, and the transistor m9 is turned off. Since the node f is in the low level state, the transistor m11 of the inverter is turned on and the transistor m12 of the inverter is turned off. Under this circumstance, the voltage of the control signal C is equal to the voltage of the external voltage source Vcc.

Since both of the transistor m4 and the transistor m6 are turned off, regardless of whether the power down signal PD is changed, the voltages at the node d and the node e are changed. Under this circumstance, the voltage of the control signal C from the controlling circuit 236 is equal to the voltage of the external voltage source Vcc in order to enable the voltage regulator 210.

When the latched signal VI is in the high level state, both of the transistor m4 and the transistor m6 are turned on. Consequently, the voltage at the node d and the voltage at the node e are determined according to the power down signal PD.

When the power down signal PD is inactivated (e.g., in the low level state), both of the transistor m5 and the transistor m7 are turned off. Under this circumstance, the voltages at the node d and the node e are equal to the voltage of the external voltage source Vcc. Consequently, the transistor m10 is turned off, the node f is in the low level state, the transistor m8 is turned on, and the transistor m9 is turned off. Since the node f is in the low level state, the transistor m11 of the inverter is turned on and the transistor m12 of the inverter is turned off. Under this circumstance, the voltage of the control signal C is equal to the voltage of the external voltage source Vcc in order to enable the voltage regulator 210.

When the power down signal PD is activated (e.g., in the high level state), both of the transistor m5 and the transistor m7 are turned on. Under this circumstance, the voltages at the node d and the node e are switched to the low level state. Consequently, the transistor m10 is turned off, the node f is in the high level state, the transistor m8 is turned off, and the transistor m9 is turned on. Since the node f is in the high level state, the transistor m11 of the inverter is turned off and the transistor m12 of the inverter is turned on. Under this circumstance, the voltage of the control signal C is equal to the low voltage level in order to disable the voltage regulator 210.

Figure 3B:
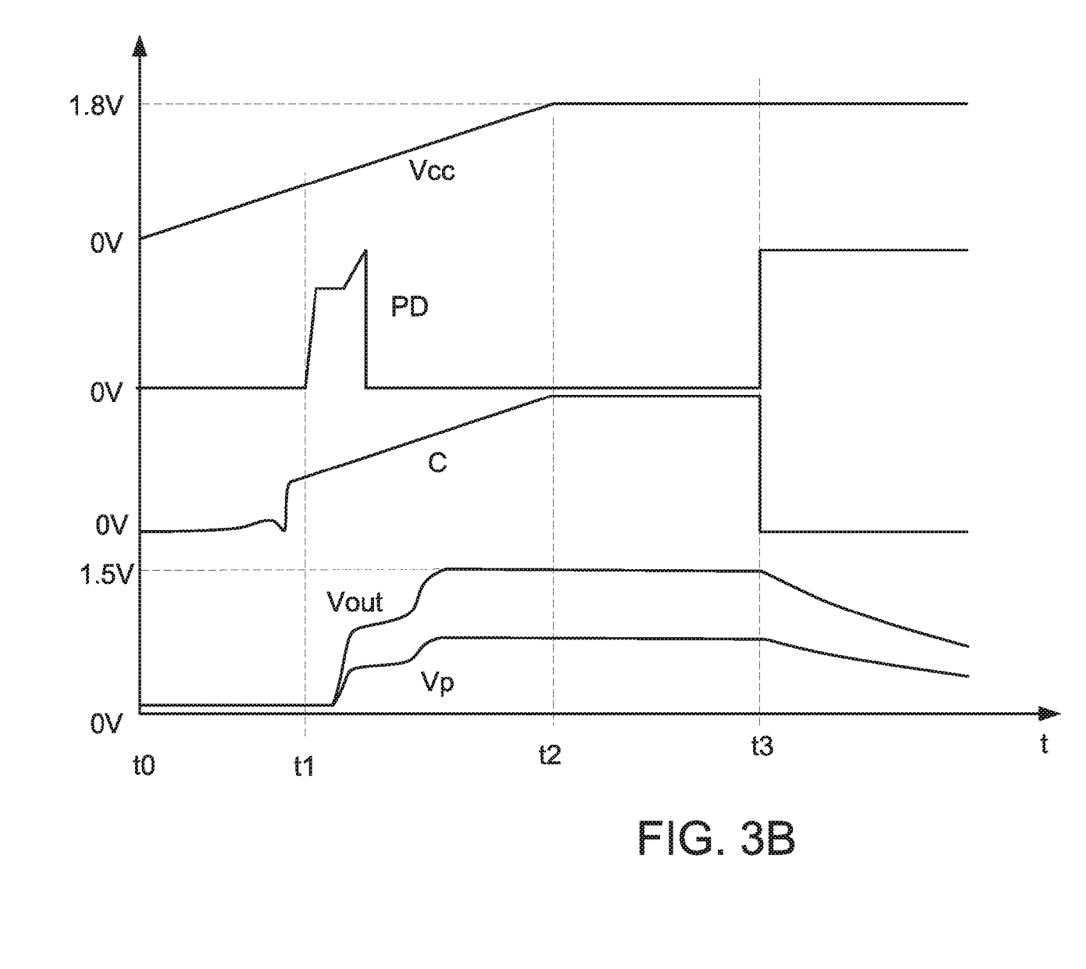
FIG. 3B is a schematic timing waveform diagram illustrating the signals associated with the power system of FIG. 3A.

FIG. 3B is a schematic timing waveform diagram illustrating the signals associated with the power system of FIG. 3A.

At the time point t0, the external voltage source Vcc is switched on. Consequently, the voltage of the external voltage source Vcc gradually increases from 0V to a stable fixed voltage (e.g., 1.8V).

While the voltage of the external voltage source Vcc gradually increases and does not reach the steady state, the power down signal PD from the digital circuit 220 contains noise at the time point t1. Since the anti-deadlock circuit 230 can block the power down signal PD before the external voltage source Vcc reaches the steady state, the voltage regulator 210 is not influenced by the noise of the power down signal PD. After the time point t1, the output voltage Vout and the proportional voltage Vp continuously increase.

At the time point t2, the external voltage source Vcc, the output voltage Vout and the proportional voltage Vp reach the steady state. Under this circumstance, the voltage regulator 210 is continuously enabled, and the digital circuit 220 is normally operated.

At the time point t3, the power down signal PD is switched from the low level state to the high level state. That is, the power down signal PD is activated. In addition, the control signal C is switched from the high level state to the low level state. Under this circumstance, the voltage regulator 210 is disabled, and the output voltage Vout and the proportional voltage Vp gradually decrease.

From the above descriptions, the present invention provides the power system 200. After the external voltage source Vcc is switched on, the anti-deadlock circuit 230 judges whether the proportional voltage Vp reaches the steady state. Before the proportional voltage Vp reaches the steady state, the anti-deadlock circuit 230 blocks the power down signal PD. That is, the power down signal PD is ignored. Under this circumstance, the control signal C is maintained at the first voltage level (e.g., the high voltage level) to enable the voltage regulator 210. Consequently, the power system 200 is not in the deadlock state. Moreover, after the proportional voltage Vp reaches the steady state, the anti-deadlock circuit 230 converts the power down signal PD into the control signal C.

Figure 4:
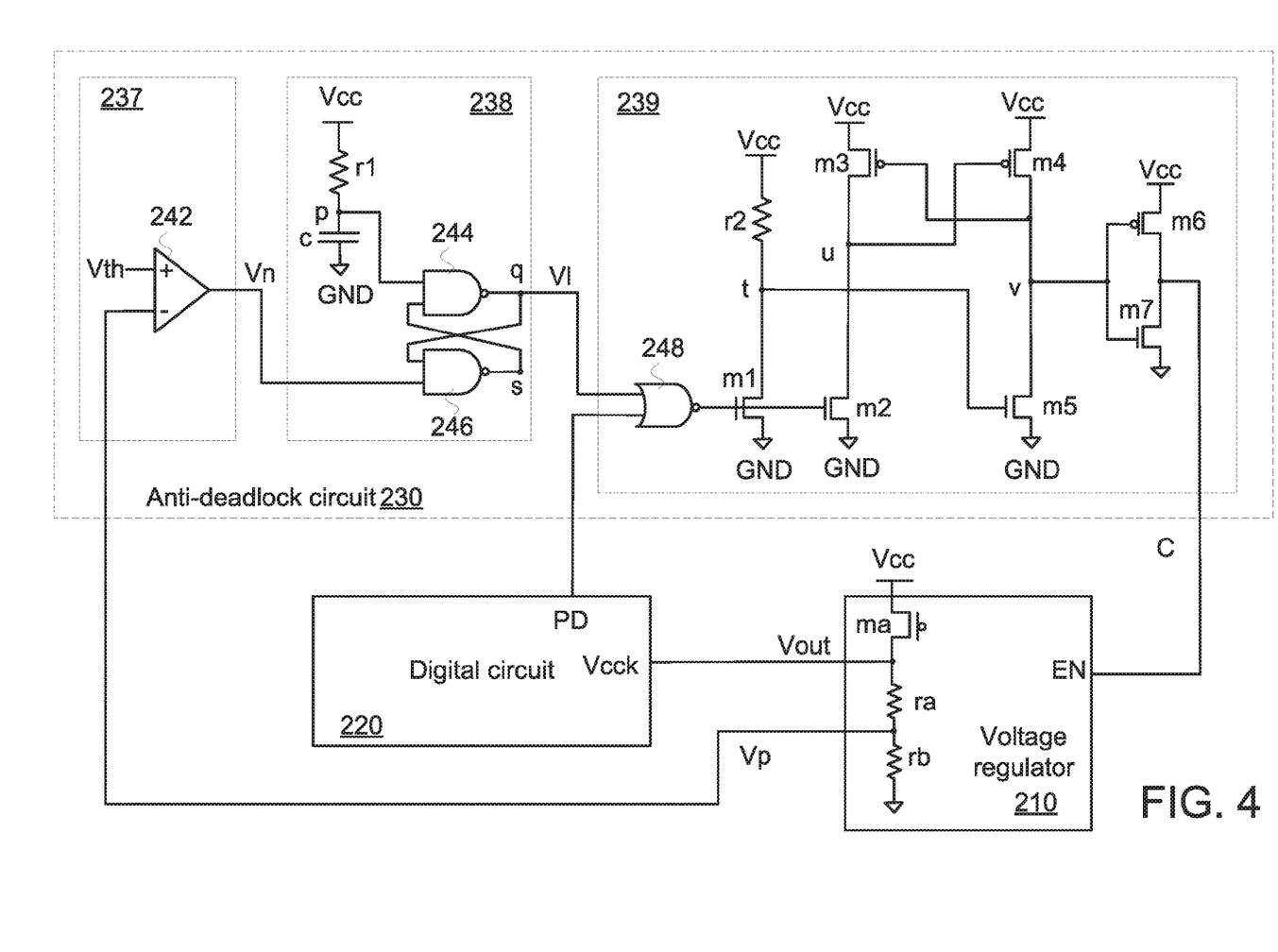
FIG. 4 is a schematic circuit diagram illustrating a second exemplary anti-deadlock circuit used in the power system of the present invention.

FIG. 4 is a schematic circuit diagram illustrating a second exemplary anti-deadlock circuit used in the power system of the present invention. As shown in FIG. 4, the anti-deadlock circuit 230 comprises a voltage detecting circuit 237, a latching circuit 238 and a controlling circuit 239. The output terminal of the voltage regulator 210 is serially connected with two resistors ra and rb in order to define a voltage divider. When the voltage regulator 210 is enabled, the transistor ma is turned on. Consequently, the voltage regulator 210 generates the proportional voltage Vp and the output voltage Vout.

The voltage detecting circuit 237 receives the proportional voltage Vp. If the proportional voltage Vp is lower than or equal to a threshold voltage Vth, a notice signal Vn outputted from the output terminal of the voltage detecting circuit 237 is in a high level state. Whereas, if the proportional voltage Vp is higher than the threshold voltage Vth, the notice signal Vn from the output terminal of the voltage detecting circuit 237 is in a low level state.

The notice signal Vn from the voltage detecting circuit 237 is received and recorded by the latching circuit 238. When the notice signal Vn is in the high level state, the latched signal Vl outputted from the latching circuit 238 has a first voltage level (e.g., a high voltage level). When the notice signal Vn is in the low level state, the latched signal Vl outputted from the latching circuit 238 has a second voltage level (e.g., a low voltage level).

The controlling circuit 239 receives the latched signal Vl and the power down signal PD, and generates the control signal C. When the latched signal Vl has the first voltage level (e.g., the high voltage level), regardless of the change of the power down signal PD, the control signal C from the controlling circuit 239 continuously enable the voltage regulator 210.

Whereas, when the latched signal Vl has the second voltage level (e.g., the low voltage level), the control signal C from the controlling circuit 239 is determined according to the power down signal PD. In case that the power down signal PD is inactivated, the control signal C enables the voltage regulator 210. Whereas, in case that the power down signal PD is activated, the control signal C disables the voltage regulator 210. The circuitry of the anti-deadlock circuit 230 will be illustrated in more details as follows.

In this embodiment, the voltage detecting circuit 237 is a comparator 242. The positive input terminal of the comparator 242 receives the threshold voltage Vth. The negative input terminal of the comparator 242 receives the proportional voltage Vp. The output terminal of the comparator 242 generates the notice signal Vn.

If the proportional voltage Vp is lower than or equal to the threshold voltage Vth, the proportional voltage Vp (or the external voltage source Vcc) does not reach the steady state. Meanwhile, the notice signal Vn is in the high level state. Whereas, if the proportional voltage Vp is higher than the threshold voltage Vth, the proportional voltage Vp (or the external voltage source Vcc) reaches the steady state. Meanwhile, the notice signal Vn is switched to the low level state.

The latching circuit 238 comprises a resistor r1, a capacitor c, a NAND gate 244 and a NAND gate 246. The resistor r1 is connected between an external voltage source Vcc and a node p. The capacitor c is connected between the node p and a ground voltage GND. The first input terminal of the NAND gate 244 is connected with the node p. The second input terminal of the NAND gate 244 is connected with a node s. The output terminal of the NAND gate 244 is connected a node q. The first input terminal of the NAND gate 246 receives the notice signal Vn. The second input terminal of the NAND gate 246 is connected with the node q. The output terminal of the NAND gate 246 is connected with the node s. The node q is the output terminal of the latching circuit 238 for outputting the latched signal VI.

After the external voltage source Vcc is switched on, the node p is in the low level state, and the node q is in the high level state. As the voltage of the external voltage source Vcc gradually increases, the notice signal Vn is in the high level state. Consequently, the output terminal (or the node s) of the NAND gate 246 is in the low level state, and the output terminal (or the node q) of the NAND gate 244 is in the high level state. In other words, as the voltage of the external voltage source Vcc gradually increases, the node q is in the high level state, and thus the latched signal VI from the latching circuit 238 has the high voltage level.

When the notice signal Vn is switched to the low level state, the output terminal (or the node s) of the NAND gate 246 is in the high level state. Since the node p is in the high level state, the output terminal (or the node q) of the NAND gate 244 is in the low level state. That is, before the voltage of the external voltage source Vcc reaches the steady state, the node q is switched to the low level state. Consequently, the latched signal VI from the latching circuit 238 has the low voltage level.

The controlling circuit 239 comprises a resistor r2, a transistor m1, a transistor m2, a transistor m3, a transistor m4, a transistor m5, a transistor m6, a transistor m7 and a NOR gate 248. The first input terminal of the NOR gate 248 receives the latched signal VI. The second input terminal of the NOR gate 248 receives the power down signal PD. The gate terminal of the transistor m1 is connected with the output terminal of the NOR gate 248. The drain terminal of the transistor m1 is connected with a node t. The source terminal of the transistor m1 is connected with the ground voltage GND. The gate terminal of the transistor m2 is connected with the output terminal of the NOR gate 248. The drain terminal of the transistor m2 is connected with a node u. The source terminal of the transistor m2 is connected with the ground voltage GND. The resistor r2 is connected between the external voltage source Vcc and the node t. The gate terminal of the transistor m3 is connected with a node v. The drain terminal of the transistor m3 is connected with the node u. The source terminal of the transistor m3 is connected with the external voltage source Vcc. The gate terminal of the transistor m4 is connected with a node u. The drain terminal of the transistor m4 is connected with the node v. The source terminal of the transistor m4 is connected with the external voltage source Vcc. The gate terminal of the transistor m5 is connected with the node t. The drain terminal of the transistor m5 is connected with the node v. The source terminal of the transistor m5 is connected with the ground voltage GND. The transistor m6 and the transistor m6 are collaboratively formed as an inverter. The input terminal of the inverter is connected with the node v. The output terminal of the inverter generates the control signal C.

When the latched signal VI from the latching circuit 238 has the high voltage level, the output terminal of the NOR gate 248 is in the low level state, both of the transistors m1 and m2 are turned off, and the voltage at the node t is equal to the voltage of the external voltage source Vcc. Consequently, the transistor m5 is turned on, the node v is in the low level state, the transistor m3 is turned on, and the transistor m4 is turned off. Since the node v is in the low level state, the transistor m6 of the inverter is turned on and the transistor m7 of the inverter is turned off. Under this circumstance, the voltage of the control signal C is equal to the voltage of the external voltage source Vcc.

Obviously, when the latched signal VI has the high voltage level, the output terminal of the NOR gate 248 is in the low level state. Consequently, regardless of the change of the power down signal PD, the voltage at the node t and the voltage at the node u cannot be changed. Under this circumstance, the voltage of the control signal C from the controlling circuit 239 is equal to the voltage of the external voltage source Vcc in order to enable the voltage regulator 210.

Moreover, when the latched signal VI has the low voltage level, the voltage level at the output terminal of the NOR gate 248 is determined according to the power down signal PD.

In case that the power down signal PD is inactivated (e.g., in the high level state), the output terminal of the NOR gate 248 is in the low level state. Meanwhile, both of the transistors m1 and m2 are turned off, and the voltages at the node t and the node u are equal to the voltage of the external voltage source Vcc. Consequently, the transistor m5 is turned on, the node v is in the low level state, the transistor m3 is turned on, and the transistor m4 is turned off. Since the node v is in the low level state, the transistor m6 of the inverter is turned on and the transistor m7 of the inverter is turned off. Under this circumstance, the voltage of the control signal C from the controlling circuit 239 is equal to the voltage of the external voltage source Vcc in order to enable the voltage regulator 210.

In case that the power down signal PD is activated (e.g., in the low level state), the output terminal of the NOR gate 248 is in the high level state. Meanwhile, both of the transistors m1 and m2 are turned on, and the node t and the node u are in the low level state. Consequently, the transistor m5 is turned off, the node v is in the high level state, the transistor m3 is turned off, and the transistor m4 is turned on. Since the node v is in the high level state, the transistor m6 of the inverter is turned off and the transistor m7 of the inverter is turned on. Under this circumstance, the control signal C is in the low level state in order to disable the voltage regulator 210.

From the above descriptions, the present invention provides the power system 200. After the external voltage source Vcc is switched on, the anti-deadlock circuit 230 judges whether the proportional voltage Vp reaches the steady state. Before the proportional voltage Vp reaches the steady state, the anti-deadlock circuit 230 blocks the power down signal PD. That is, the power down signal PD is ignored. Under this circumstance, the control signal C is maintained at the first voltage level (e.g., the high voltage level) to enable the voltage regulator 210. Consequently, the power system 200 is not in the deadlock state. Moreover, after the proportional voltage Vp reaches the steady state, the anti-deadlock circuit 230 converts the power down signal PD into the control signal C.

Figure 5:
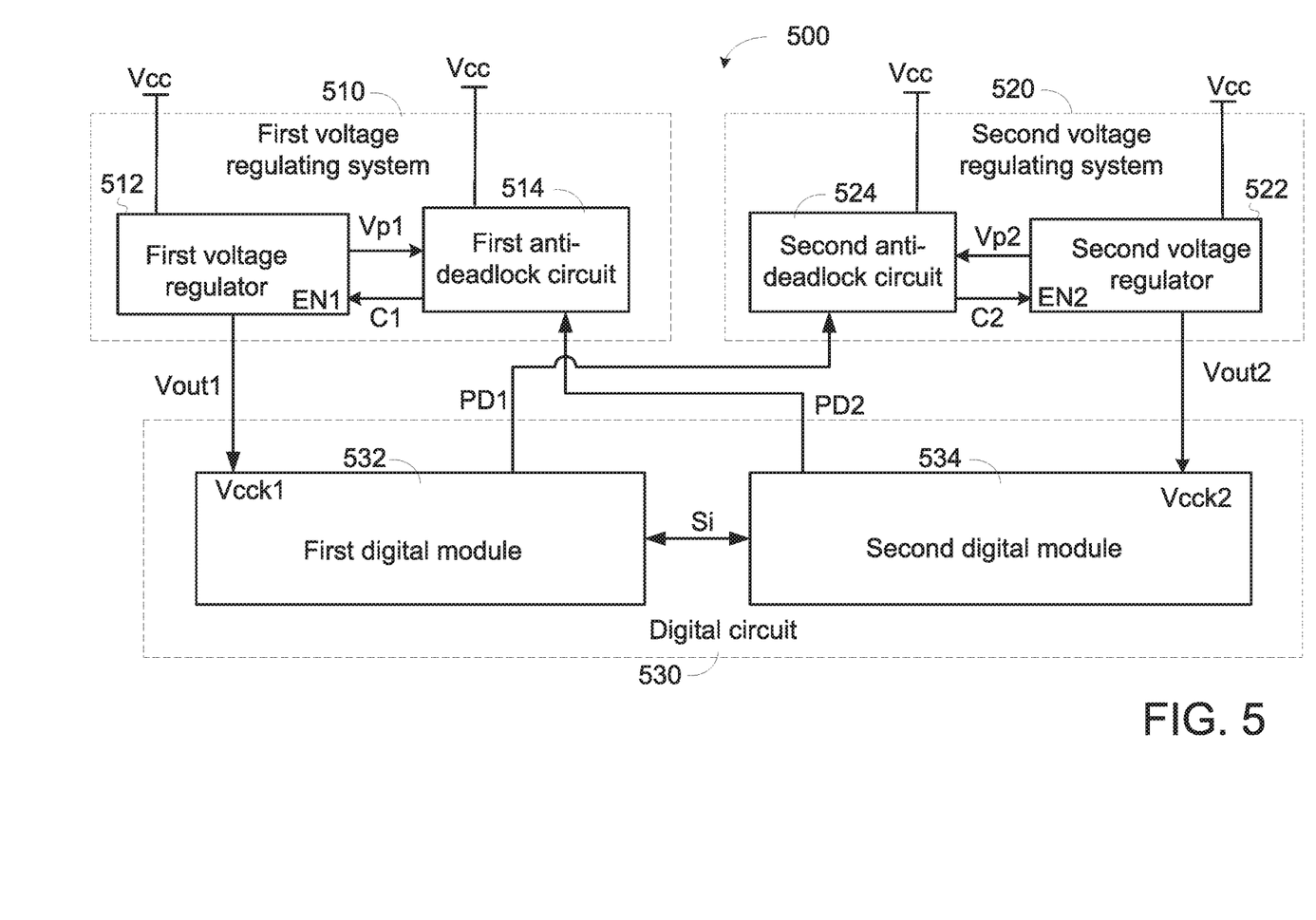
FIG. 5 is a schematic functional block diagram illustrating a multi-power system according to an embodiment of the present invention.

The concepts of the present invention can be applied to a multi-power system. FIG. 5 is a schematic functional block diagram illustrating a multi-power system according to an embodiment of the present invention. As shown in FIG. 5, the multi-power system 500 comprises a first voltage regulating system 510, a second voltage regulating system 520 and a digital circuit 530. The first voltage regulating system 510 comprises a first voltage regulator 512 and a first anti-deadlock circuit 514. The second voltage regulating system 520 comprises a second voltage regulator 522 and a second anti-deadlock circuit 524. The digital circuit 530 comprises a first digital module 532 and a second digital module 534.

The configurations of the first voltage regulating system 510 and the second voltage regulating system 520 are similar to the configuration of the voltage regulating system 205 of FIG. 2, and are not redundantly described herein.

In this embodiment, the first digital module 532 of the digital circuit 530 is a power domain of a first output voltage Vout1, and the second digital module 534 of the digital circuit 530 is a power domain of a second output voltage Vout2. That is, the power supply terminal Vcck1 of the first digital module 532 receives the first output voltage Vout1, and the power supply terminal Vcck2 of the second digital module 534 receives the second output voltage Vout2. Moreover, the first digital module 532 and second digital module 534 are in communication with each other through a communication signal Si. Moreover, the first digital module 532 issues a first power down signal PD1 to the second anti-deadlock circuit 524, and the second digital module 534 issues a second power down signal PD2 to the first anti-deadlock circuit 514.

After an external voltage source Vcc is switched on, the first voltage regulating system 510 generates the first output voltage Vout1 to the first digital module 532, and the second voltage regulating system 520 generates the second output voltage Vout2 to the second digital module 534. Before the voltage of the external voltage source Vcc reaches the steady state, even if the first power down signal PD1 from the first digital module 532 or the second power down signal PD2 from the second digital module 534 contains noise, the multi-power system 500 is not in the deadlock state.

After the voltage of the external voltage source Vcc reaches the steady state, the digital circuit 530 can be normally operated. When the digital circuit 530 is not operated, the first digital module 532 activates the first power down signal PD1 and the second digital module 534 activates the second power down signal PD2. Consequently, the second voltage regulating system 520 stops issuing the second output voltage Vout2, and the first voltage regulating system 510 stops issuing the first output voltage Vout1.

As mentioned above, the digital circuit 530 has two power domains. In an embodiment, the second digital module 534 is in a sleep mode under control of the first digital module 532, or the first digital module 532 is in the sleep mode under control of the second digital module 534.

For example, when the second digital module 534 is ready to enter the sleep mode, the first digital module 532 activates the first power down signal PD1. Consequently, the second voltage regulating system 520 stops issuing the second output voltage Vout2 to the second digital module 534. Since the first voltage regulating system 510 still issues the first output voltage Vout1 to the first digital module 532, the first digital module 532 is normally operated and the second digital module 534 enters the sleep mode.

For operating the second digital module 534 again, the first digital module 532 inactivates the first power down signal PD1. Consequently, the second voltage regulating system 520 issues the second output voltage Vout2 to the second digital module 534 again to wake up the second digital module 534.

Similarly, when the second digital module 534 activates the second power down signal PD2, the first digital module 532 enters the sleep mode. The operations are similar to those mentioned above, and are not redundantly described herein.

From the above descriptions, the present invention provides an anti-deadlock circuit and an associated power system. By the anti-deadlock circuit, the power system is not in the deadlock state. Moreover, the present invention also provides a multi-power system with plural voltage regulating systems. In the multi-power system, the digital module of the digital circuit can be controlled to enter the sleep mode or the digital module in the sleep mode can be waked up.

As mentioned above, there is a fixed ratio between the proportional voltage Vp and the output voltage Vout. In another embodiment, the output voltage Vout is directly used as the proportional voltage Vp, and the voltage detecting circuit judges whether the output voltage Vout reaches the steady state.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power system, comprising:
a voltage regulator connected with an external voltage source, and receiving a control signal, wherein when the voltage regulator is enabled by the control signal, the voltage regulator generates an output voltage and a proportional voltage, wherein when the voltage regulator is disabled by the control signal, the voltage regulator stops generating the output voltage and the proportional voltage, wherein there is a fixed ratio between the output voltage and the proportional voltage;
a digital circuit connected with the voltage regulator, wherein when the digital circuit receives the output voltage, the digital circuit is operated, wherein when the digital circuit is not operated, an power down signal is activated; and
an anti-deadlock circuit comprises: a voltage detecting circuit receiving the proportional voltage, wherein if the proportional voltage is higher than a threshold voltage, a notice signal is activated; a latching circuit connected with the voltage detecting circuit, wherein when the notice signal is inactivated, a latched signal outputted from the latching circuit has a first voltage level, wherein when the notice signal is activated, the latched signal outputted from the latching circuit has a second voltage level; and a controlling circuit connected with the latching circuit and the digital circuit, and receiving the power down signal;
wherein if the latched signal has the first voltage level, the controlling circuit uses the control signal to enable the voltage regulator, wherein if the latched signal has the second voltage level and the power down signal is inactivated, the controlling circuit uses the control signal to enable the voltage regulator, wherein if the latched signal has the second voltage level and the power down signal is activated, the controlling circuit uses the control signal to disable the voltage regulator.

2. The power system as claimed in claim 1, wherein the voltage detecting circuit comprises:
a first transistor, wherein a gate terminal of the first transistor receives the proportional voltage, a drain terminal of the first transistor is connected with a node a, and a source terminal of the first transistor is connected with a ground voltage; and
a first resistor connected between the external voltage source and the node a,
wherein the node a is an output terminal of the voltage detecting circuit for outputting the notice signal.

3. The power system as claimed in claim 2, wherein the latching circuit comprises:
a second transistor, wherein a gate terminal of the second transistor receives the notice signal, a drain terminal of the second transistor is connected with a node b, and a source terminal of the second transistor is connected with the ground voltage;
a third transistor, wherein a gate terminal of the third transistor is connected with the node b, a drain terminal of the third transistor is connected with the gate terminal of the second transistor, and a source terminal of the third transistor is connected with the ground voltage;
a second resistor connected between the external voltage source and the node b; and
a capacitor connected between the node b and the ground voltage,
wherein the node b is an output terminal of the latching circuit for outputting the latched signal.

4. The power system as claimed in claim 3, wherein the controlling circuit comprises:
a fourth transistor, wherein a gate terminal of the fourth transistor receives the latched signal, and a drain terminal of the fourth transistor is connected with a node d;
a fifth transistor, wherein a gate terminal of the fifth transistor receives the power down signal, a drain terminal of the fifth transistor is connected with a source terminal of the fourth transistor, and a source terminal of the fifth transistor is connected with the ground voltage;
a third resistor connected between the external voltage source and the node d;
a sixth transistor, wherein a gate terminal of the sixth transistor receives the latched signal, and a drain terminal of the sixth transistor is connected with a node e;
a seventh transistor, wherein a gate terminal of the seventh transistor receives the power down signal, a drain terminal of the seventh transistor is connected with a source terminal of the sixth transistor, and a source terminal of the seventh transistor is connected with the ground voltage;
an eighth transistor, wherein a gate terminal of the eighth transistor is connected with a node f, a drain terminal of the eighth transistor is connected with the node e, and a source terminal of the eighth transistor is connected with the external voltage source;
a ninth transistor, wherein a gate terminal of the ninth transistor is connected with the node e, a drain terminal of the ninth transistor is connected with the node f, and a source terminal of the ninth transistor is connected with the external voltage source;
a tenth transistor, wherein a gate terminal of the tenth transistor is connected with the node d, a drain terminal of the tenth transistor is connected with the node f, and a source terminal of the tenth transistor is connected with the ground voltage; and
an inverter, wherein an input terminal of the inverter is connected with the node f, and an output terminal of the inverter generates the control signal.

5. The power system as claimed in claim 1, wherein the voltage detecting circuit comprises a comparator, wherein a positive input terminal of the comparator receives the threshold voltage, a negative input terminal of the comparator receives the proportional voltage, and an output terminal of the comparator generates the notice signal.

6. The power system as claimed in claim 5, wherein the latching circuit comprises:
a first resistor is connected between an external voltage source and a node p;
a capacitor connected between the node p and a ground voltage;
a first NAND gate, wherein a first input terminal of the first NAND gate is connected with the node p, a second input terminal of the first NAND gate is connected with a node s, and an output terminal of the first NAND gate is connected a node q; and
a second NAND gate, wherein a first input terminal of the second NAND gate receives the notice signal, a second input terminal of the second NAND gate is connected with the node q, and an output terminal of the second NAND gate is connected with the node s,
wherein the node q is an output terminal of the latching circuit for outputting the latched signal.

7. The power system as claimed in claim 6, wherein the controlling circuit comprises:
a NOR gate, wherein a first input terminal of the NOR gate receives the latched signal, and a second input terminal of the NOR gate receives the power down signal;
a first resistor, wherein a gate terminal of the first transistor is connected with an output terminal of the NOR gate, a drain terminal of the first transistor is connected with a node t, and a source terminal of the first transistor is connected with the ground voltage;
a second resistor, wherein a gate terminal of the second transistor is connected with the output terminal of the NOR gate, a drain terminal of the second transistor is connected with a node u, and a source terminal of the second transistor is connected with the ground voltage;
a second resistor connected between the external voltage source and the node t;
a third transistor, wherein a gate terminal of the third transistor is connected with a node v, a drain terminal of the third transistor is connected with the node u, and a source terminal of the third transistor is connected with the external voltage source;
a fourth transistor, wherein a gate terminal of the fourth transistor is connected with a node u, a drain terminal of the fourth transistor is connected with the node v, and a source terminal of the fourth transistor is connected with the external voltage source;
a fifth transistor, wherein a gate terminal of the fifth transistor is connected with the node t, a drain terminal of the fifth transistor is connected with the node v, and a source terminal of the fifth transistor is connected with the ground voltage; and
an inverter, wherein an input terminal of the inverter is connected with the node v, and an output terminal of the inverter generates the control signal.

8. A power system, comprising:
a digital circuit comprising a first digital module and a second digital module, wherein the first digital module is operated when the first digital module receives a first output voltage, and the first digital module selectively activates a first power down signal, wherein the second digital module is operated when the second digital module receives a second output voltage, and the second digital module selectively activates a second power down signal;

a first voltage regulating system connected with an external voltage source, and receiving the second power down signal, wherein the first voltage regulating system selectively generates the first output voltage according to the second power down signal; and a second voltage regulating system connected with the external voltage source, and receiving the first power down signal, wherein the second voltage regulating system selectively generates the second output voltage according to the first power down signal, wherein after the external voltage source is switched on and before a voltage of the external voltage source reaches a fixed voltage, the first voltage regulating system ignores the second power down signal and generates the first output voltage, wherein after the voltage of the external voltage source reaches the fixed voltage, the first voltage regulating system generates the first output voltage if the second power down signal is inactivated, and the first voltage regulating system stops generating the first output voltage if the second power down signal is activated.

9. The power system as claimed in claim 8, wherein after the external voltage source is switched on and before the voltage of the external voltage source reaches the fixed voltage, the second voltage regulating system ignores the first power down signal and generates the second output voltage, wherein after the voltage of the external voltage source reaches the fixed voltage, the second voltage regulating system generates the second output voltage if the first power down signal is inactivated, and the second voltage regulating system stops generating the second output voltage if the first power down signal is activated.

10. The power system as claimed in claim 9, wherein the first voltage regulating system comprises:

a first voltage regulator connected with the external voltage source, and receiving a first control signal, wherein when the first voltage regulator is enabled by the first control signal, the first voltage regulator generates the first output voltage and a first proportional voltage, wherein when the first voltage regulator is disabled by the first control signal, the first voltage regulator stops generating the first output voltage and the first proportional voltage, wherein there is a fixed ratio between the first output voltage and the first proportional voltage; and a first anti-deadlock circuit connected with the external voltage source to receive the second power down signal and generate the first control signal, wherein after the external voltage source is switched on and before the voltage of the external voltage source reaches the fixed voltage, the first anti-deadlock circuit blocks the second power down signal and uses the first control signal to enable the first voltage regulator, wherein after the voltage of the external voltage source reaches the fixed voltage, the first voltage regulating system uses the first control signal to enable the first voltage regulator if the second power down signal is inactivated, and the first voltage regulating system uses the first control signal to disable the first voltage regulator if the second power down signal is activated.

11. The power system as claimed in claim 9, wherein the second voltage regulating system comprises:

a second voltage regulator connected with the external voltage source, and receiving a second control signal, wherein when the second voltage regulator is enabled by the second control signal, the second voltage regulator generates the second output voltage and a second proportional voltage, wherein when the second voltage regulator is disabled by the second control signal, the second voltage regulator stops generating the second output voltage and the second proportional voltage, wherein there is a fixed ratio between the second output voltage and the second proportional voltage; and an second anti-deadlock circuit connected with the external voltage source to receive the first power down signal and generate the second control signal, wherein after the external voltage source is switched on and before the voltage of the external voltage source reaches the fixed voltage, the second anti-deadlock circuit blocks the first power down signal and uses the second control signal to enable the second voltage regulator, wherein after the voltage of the external voltage source reaches the fixed voltage, the second voltage regulating system uses the second control signal to enable the second voltage regulator if the first power down signal is inactivated, and the second voltage regulating system uses the second control signal to disable the second voltage regulator if the first power down signal is activated.

* * * * *